United States Patent [19]

Quinn

[11] 4,146,002
[45] Mar. 27, 1979

[54] INTERNAL COMBUSTION ENGINE FUEL SYSTEM

[76] Inventor: Raymond L. Quinn, 52 Wales St., N. Abington, Mass. 02351

[21] Appl. No.: 813,757

[22] Filed: Jul. 7, 1977

Related U.S. Application Data

[63] Continuation-in-part of Ser. No. 715,908, Aug. 19, 1976, abandoned.

[51] Int. Cl.$^2$ ............................................. F02M 31/00
[52] U.S. Cl. .................................. 123/122 E; 123/133
[58] Field of Search .................... 123/122 E, 127, 133, 123/122 D, 142.5 R, 122 H, 121, 122 A; 261/144, 145

[56] References Cited

U.S. PATENT DOCUMENTS

| | | | |
|---|---|---|---|
| 1,110,724 | 9/1914 | Stewart | 123/122 A |
| 1,168,111 | 1/1916 | Pope | 123/122 E |
| 1,318,068 | 10/1919 | Giesler | 123/122 H |
| 2,315,881 | 4/1943 | Thomas | 123/121 |
| 2,315,882 | 4/1943 | Trimble | 123/127 |
| 2,339,988 | 1/1944 | Gerson | 123/121 |
| 3,354,872 | 11/1967 | Gratzmuller | 123/122 E |
| 3,738,334 | 6/1973 | Farr | 123/133 |
| 3,832,985 | 9/1974 | Edde | 123/127 |
| 3,929,187 | 12/1975 | Hurner | 123/122 E |
| 3,986,486 | 10/1976 | Rabbiosi | 123/122 E |
| 4,027,639 | 6/1977 | Amano | 123/133 |

FOREIGN PATENT DOCUMENTS

960534  1/1975  Canada ................................ 123/122 E

Primary Examiner—Ronald H. Lazarus
Attorney, Agent, or Firm—Jerry Cohen

[57] ABSTRACT

Fuel in the fuel line of an internal combustion engine is preheated before admixture with air to increase combustion efficiency, as indicated for instance by improved mileage of an automobile driven by an internal combustion engine, and to reduce noxious content of the combustion engine exhaust.

2 Claims, 2 Drawing Figures

INTERNAL COMBUSTION ENGINE FUEL SYSTEM

CROSS REFERENCE TO RELATED APPLICATIONS

This application is a continuation-in-part of my co-pending application, Ser. No. 715,908, filed Aug. 19, 1976, now abandoned.

BACKGROUND OF THE INVENTION

The present invention relates to internal combustion engines for driving vehicles and other purposes, it more particularly concerns fuel preheating to enhance combustion efficiency.

The art, including these references: (U.S. Patents)

| | | |
|---|---|---|
| 2,001,669 | May 14, 1935 | Smith |
| 2,999,486 | Sep. 12, 1961 | Guarnaschelli |
| 3,253,647 | May 31, 1966 | Deshaies |
| 3,354,872 | Nov. 28, 1967 | Gratzmuller |
| 3,473,522 | Oct. 1969 | Bailey |
| 3,762,385 | Oct. 2, 1973 | Hollnagel |
| 3,797,468 | Mar. 19, 1974 | Fisher |
| 3,832,985 | Sep. 3, 1974 | Edde |
| 3,986,483 | Oct. 19, 1976 | Rabbiosi |
| 3,989,019 | Nov. 2, 1976 | Brandt et al. | has provided means for preheating the mixed air/fuel content or fuel per se going to the carburetor of an internal combustion engine to improve combustion efficiency. But they have not been adopted widely because of overcomplication or expense outweighing potential benefits.

It is an important object of the present invention to improve combustion efficiency, to reduce noxious content of exhaust gases and generally enhance the efficiency of internal combustion engines through means usable either as original equipment or as a retrofit of existing combustion engine equipment.

It is a further object of the invention to provide reliable fuel temperature responsive automatic control consistent with the preceding object.

It is a further object to economically and simply achieve one or both of the preceding objects.

SUMMARY OF THE INVENTION

Hot water heating is provided around the fuel line leading to the carburetor of an automobile internal combustion engine, or other combustion engine, the hot water preferably being tapped in the case of automobile usage, from the radiator cooler of the engine. Temperature of the heated fuel is monitored and applied to automatic water temperature control. Substantial benefit, in accordance with the above objects has been observed.

The invention will be understood best through reference to the following detailed description of preferred embodiments thereof, taken in connection with the accompanying drawing, in which,

DETAILED DESCRIPTION OF PREFERRED EMBODIMENTS

Figure 1:
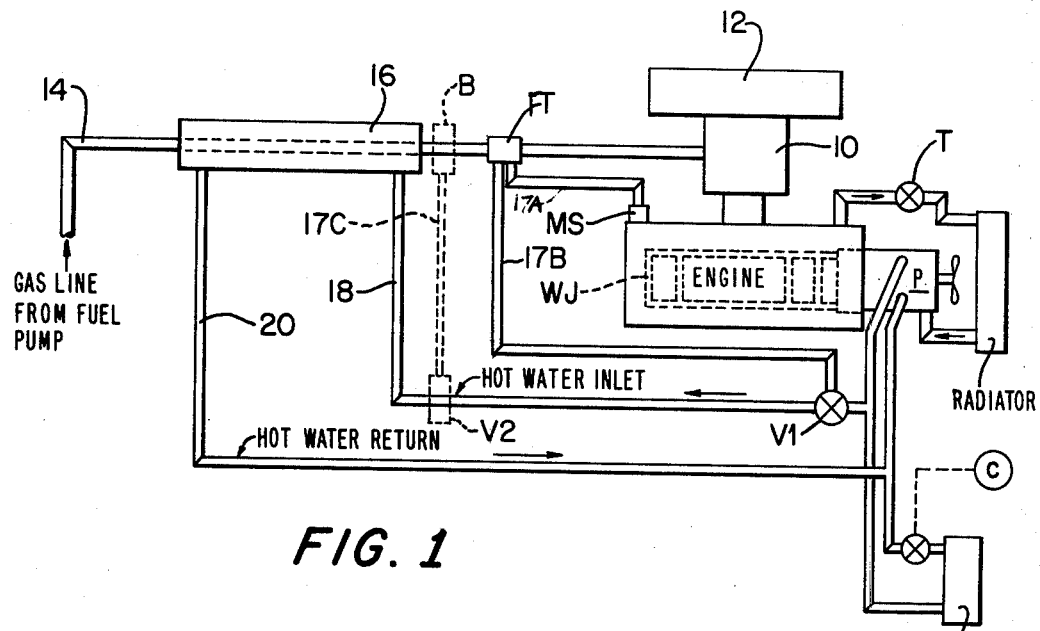
FIGS. 1 and 2 are schematic designs of an internal combustion engine fuel system modified in accordance with two preferred embodiments of the invention.

The engine has a carburetor 10 and an air cleaner 12. The fuel line is indicated at 14 and at an intermediate point of its length between the fuel tank and the carburetor 10, is surrounded by a tubular jacket 16 which has an inlet pipe 18 and an outlet 20, both of which are connected to the conventional automobile cooling radiator. The jacket 16 may be made of 20-50 mil wall copper with soldered or brazed-on end walls of similar thickness.

Control of temperature is automatically provided by a fuel line thermoswitch FT which controls a vacuum line 17A, 17B, connected from an engine manifold nipple MS to provide manifold suction to a vacuum valve V in the hot water inlet line 18. The unit fulfills all the above stated objects.

A unit substantially as shown in FIG. 1 of the drawing (but without automatic temperature control), as such, has delivered substantially better mileage and reduction of pollutant emission of the engine exhaust, as demonstrated on test conducted on two different automobiles. In one such series of tests, a 1967 Dodge-Slant Six ¾ van truck was monitored as emitting 10+ carbon dioxide-500 ppm hydrocarbons in the exhaust without the unit shown in the drawing and operated with such unit emitted 2.8 carbon dioxide-80 ppm hydrocarbons. 10–20% gas mileage improvement was also observed in several tests on this vehicle.

In accordance with a further aspect of the invention, the water to heat the fuel is indirectly tapped to assure availability, even at starting. It is conventional to tap engines heated water (which normally circulates through the radiator, water jacket WJ and pump P or just through WJ and P on starting) for heating a passenger compartment and to do so in a way to utilize the single water pump for pawsenger space heating even if the thermostat controlled valve blocks engine to radiator circulation. In turn, the tap for the fuel heating of the present invention is arranged to utilize said pump regardless of engine-radiator or engine-passenger space heater flow or non-flow condition.

It will be apparent from the drawing that existing combustion engine fuel systems can be relatively modified at low cost and with little change in the volumetric envelope of parts and little hindrance to service accessibility of surrounding engine parts. Alternatively, the installation of the present invention in new equipment would entail little increase in cost in connection with engine fuel system manufacture. Fuel heating is available at engine start by virtue of location ahead of any shut off valve except as may be provided in the fuel heat system. The size and configuration of the conduit and coolant flow can be modified to meet varying requirements of different combustion engines to be benefitted through the invention.

Figure 2:
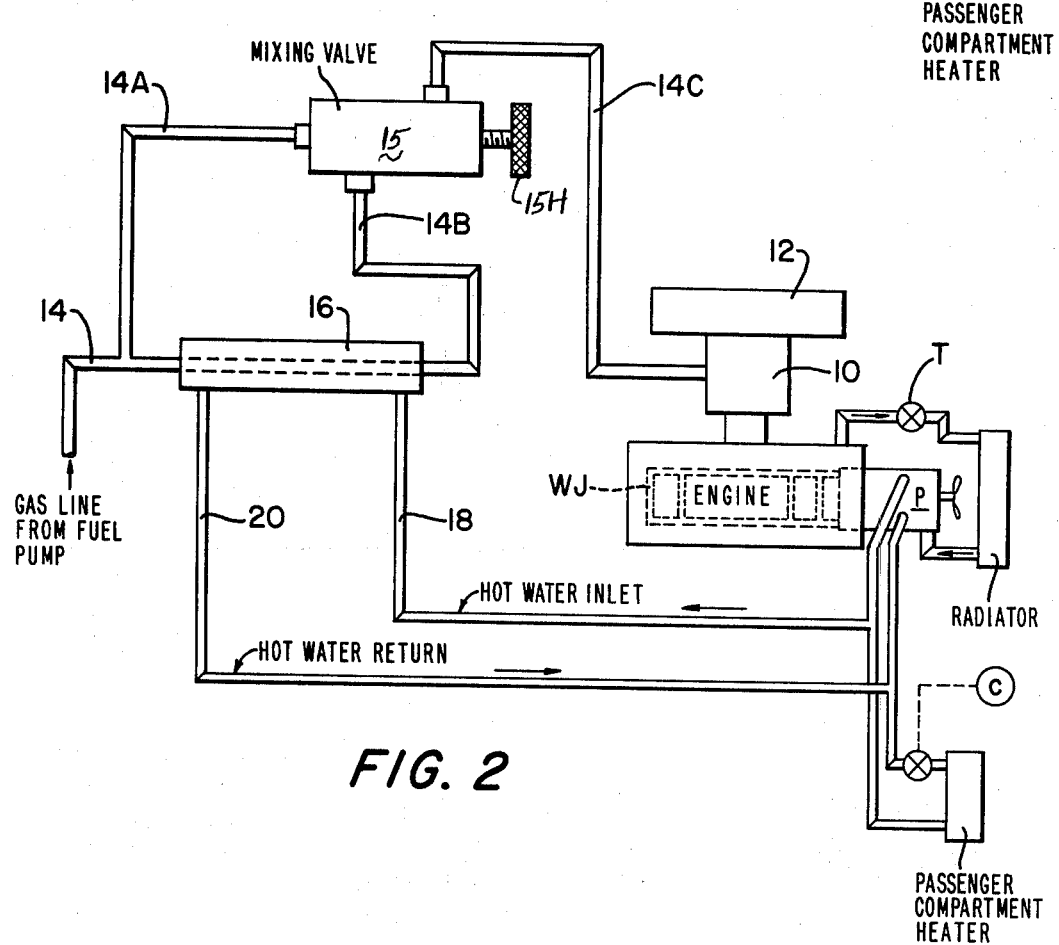

FIG. 2 shows a second embodiment of the invention wherein like parts (compared to FIG. 1) have similar reference numerals. Automatic temperature control (and manual set) is provided through a mixing valve 15 of a type conventional in water control which is used herein to pass heated fuel from line 14B to 14C. When a set upper temperature limit (preferably at about 150° F.–160° F.) is reached, it automatically allows line 14A–14C communication of cold fuel flow to the carburetor mixing with the heated fuel. Both cold and heated fuel are then admitted to line 14C in a ratio determined by the setting of handle 15H of the mixing valve and the internal thermostatic valve. The handle may be used to set the device to different maximum temperatures. This arrangement fulfills all the above stated objects. Overpressure of fuel if any is vented back to the cold inlet side, thereby enabling economy and simplicity of construction consistent with achieving such objects. In adapting water mixing valves to fuel usage, component materials must be screened for gasoline solubility and replaced with more inert substitutes. Alternatively to the arrangement described above in FIG. 1, a bulb thermometer B can respond to fuel line temperatures to expand fluid applied to a bulb type valve V2 via a line 17C as also shown in FIG. 1.

The invention does not require the expensive pressure and temperature regulator components found in the above cited prior art.

Other objects, features and advantages of the invention will now be apparent to those skilled in the art. It is therefore intended that the above disclosure shall be read as illustrative and not in a limiting sense.

What is claimed is:

1. Improvement for combustion engines having pumped fuel feed, comprising a fuel line leading to a region of air/fuel mixing of the engine and having a pumped circulation liquid cooling system loop comprising, (a) heat exchange means with a fuel inlet and fuel outlet, inserted in said fuel line for preheating the fuel to increase its temperature prior to such fuel-/air admixing by heat exchange with flowing coolant of said cooling system,
   (b) means for measuring temperature of the fuel and limiting the extent of fuel preheating comprising:
      (i) a mixing valve, mixing fuel from upstream and downstream of said heat exchanger and passing the mixed fuel to the engine carburetor,
      (ii) fuel temperature responsive means in said mixing valve to reduce heating by limiting the amounts of heated fuel that enter the carburetor and admitting a higher proportion of unheated fuel, and
      (iii) said mixing valve being constructed and arranged to vent fuel overpressure to the heat exchanger inlet side in the fuel line.

2. Improvement for combustion engines in accordance with claim 1 comprising coolant tapping means in parallel with said loop constructed and arranged so that coolant from said coolant system so that the fuel heater continuously receive said coolant.

* * * * *